July 1, 1924.  R. J. SMITH  1,499,559
GRAVITY BASKET
Filed Oct. 21, 1921
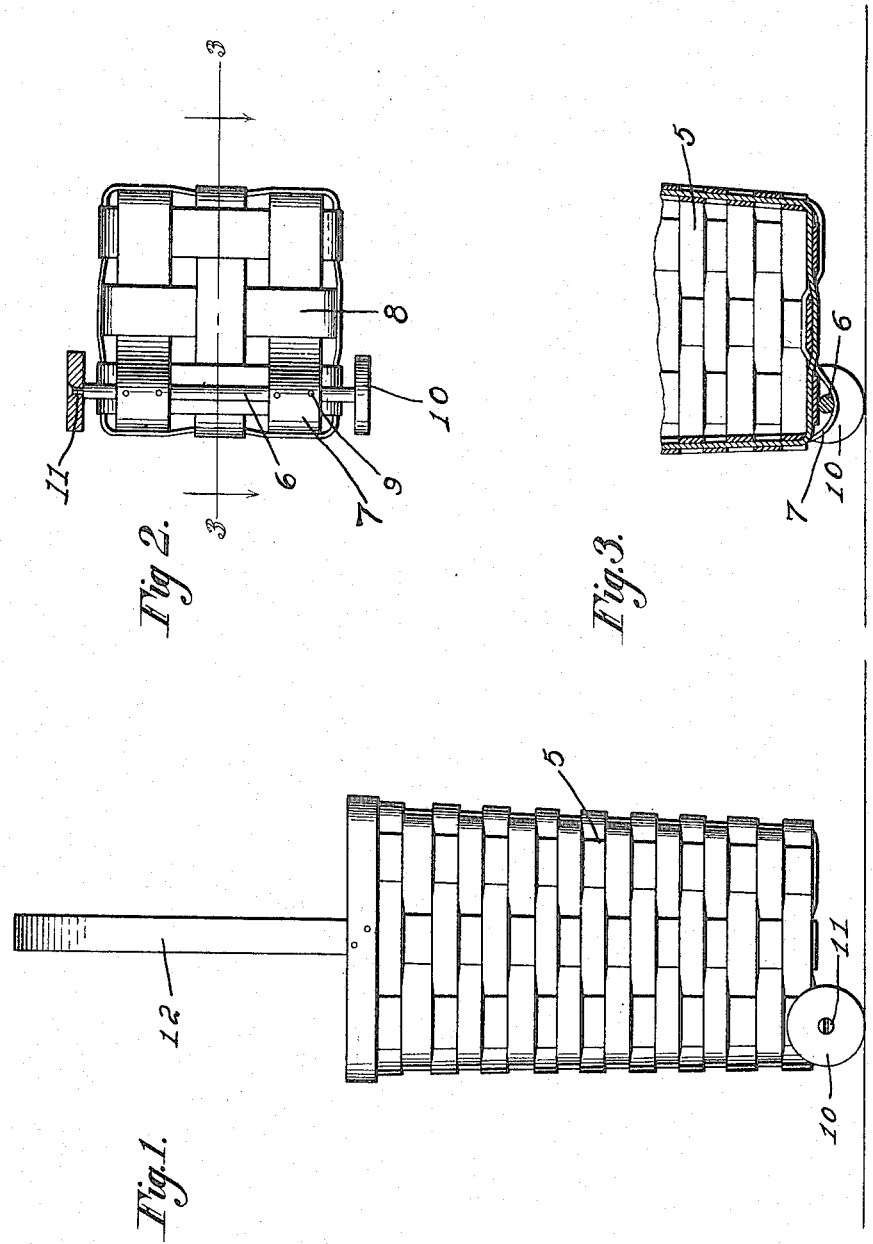
Inventor
R. J. Smith.
By C. A. Snow & Co.
Attorney Patented July 1, 1924.

1,499,559

UNITED STATES PATENT OFFICE.

ROSALIE J. SMITH, OF WASHINGTON, DISTRICT OF COLUMBIA.

GRAVITY BASKET.

Application filed October 21, 1921. Serial No. 509,367.

*To all whom it may concern:*

Be it known that I, ROSALIE J. SMITH, a citizen of the United States, residing at city of Washington, in the District of Columbia, have invented new and useful Gravity Baskets, of which the following is a specification.

This invention relates to package and article carriers, the primary object of the invention being to provide a specially constructed basket to be supported on wheels to obviate the necessity of a person carrying the basket and the contents thereof.

Another object of the invention is to provide a device having a relatively long bail, constructed to act as a handle to push the carrier over the surface on which the same is supported.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a side elevational view of a carrier constructed in accordance with the present invention.

Figure 2 is a bottom plan view of the same.

Figure 3 is a sectional view taken on line 3—3 of Figure 2.

Referring to the drawing in detail, the body portion 5 of the carrier is relatively long, the same being formed preferably of slat material employed in constructing slat baskets.

As clearly shown by Figure 2 of the drawing, an axle 6 which is made preferably of wood, is passed under the slats 7 which form a portion of the bottom of the basket, portions of the slat 7 passing under the transversely extending slat 8 which also forms a part of the basket.

This axle 6 is disposed adjacent to one of the side edges of the basket so that the basket may be conveniently rolled.

Suitable securing nails indicated at 9 are passed through the slat 7 and embedded in the axle 6, whereby movement of the axle with respect to the basket, is prevented. Wheels indicated at 10 are mounted on the axle 6 adjacent to the ends thereof, it being contemplated to position a screw such as indicated at 11 in the respective ends of the axle to secure the wheels thereto.

In order that the carrier may be rolled with facility, a handle 12 is provided, the handle being relatively long to permit a person to grasp the same while in an upright position, eliminating the necessity of a person leaning over to roll the carrier.

From the foregoing it will be seen that I have provided a carrier which may be rolled from place to place, obviating the necessity of a person lifting the weight of the carrier and its contents while making purchases.

Having thus described the invention, what is claimed as new is:—

In a wheeled carrier, an elongated body portion including a bottom member, said body portion and bottom member being constructed of interwoven transversely and vertically extending slat members, an axle member resting on one of the slat members of the bottom portion, slats disposed over the axle and secured thereto to hold the axle against displacement, wheels on the axle, and a handle at one end of the body portion.

In testimony that I claim the foregoing as my own, I have hereto affixed my signature in the presence of two witnesses.

ROSALIE J. SMITH.

Witnesses:
HENRIETTA S. ROUSSEAU,
RUDOLPH HARRELL.